United States Patent
Vilermo et al.

(10) Patent No.: US 12,456,232 B2
(45) Date of Patent: Oct. 28, 2025

(54) DISPLAYED IMAGE TRANSITION

(71) Applicant: Nokia Technologies Oy, Espoo (FI)

(72) Inventors: Miikka Tapani Vilermo, Siuro (FI);
Arto Juhani Lehtiniemi, Lempaala (FI); Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 167 days.

(21) Appl. No.: 18/075,884

(22) Filed: Dec. 6, 2022

(65) Prior Publication Data

US 2023/0177742 A1   Jun. 8, 2023

(30) Foreign Application Priority Data

Dec. 8, 2021   (EP) ..................................... 21213021

(51) Int. Cl.
| | | |
|---|---|---|
| *G06T 11/00* | (2006.01) | |
| *G06T 3/60* | (2024.01) | |
| *G06T 5/50* | (2006.01) | |
| *G06T 5/70* | (2024.01) | |

(52) U.S. Cl.
CPC ................ *G06T 11/00* (2013.01); *G06T 3/60* (2013.01); *G06T 5/50* (2013.01); *G06T 5/70* (2024.01); *G06T 2210/22* (2013.01)

(58) Field of Classification Search
CPC ... G06T 11/00; G06T 3/60; G06T 5/50; G06T 5/70; G06T 2210/22
See application file for complete search history.

(56) References Cited

U.S. PATENT DOCUMENTS

| | | | | |
|---|---|---|---|---|
| 2014/0347354 | A1* | 11/2014 | Van Osten | G06T 3/20 345/419 |
| 2016/0104301 | A1 | 4/2016 | Liu et al. | |
| 2016/0371265 | A1* | 12/2016 | Aksu | G06F 16/51 |

(Continued)

FOREIGN PATENT DOCUMENTS

| | | |
|---|---|---|
| AU | 2015258346 A1 | 6/2017 |
| EP | 3 346 709 A1 | 7/2018 |

OTHER PUBLICATIONS

Sullivan, G. et al., "Proposed update of the WD for Multi-Image Application Format," International Organisation for Standardisation, Coding of Moving Pictures and Associated Audio Information, ISO/IEC/JTC1/SC29/WG11 m41655, Macao, CN, Jun. 2020.

(Continued)

*Primary Examiner* — Xiao M Wu
*Assistant Examiner* — Latrell Anthony Creary
(74) *Attorney, Agent, or Firm* — McCarter & English LLP

(57) ABSTRACT

An apparatus including circuitry configured to: transition from displaying an in-focus image of a first scene to displaying a first alternative image; transition from displaying the first alternative image to displaying a second alternative image; transition from displaying the second alternative image to displaying an in-focus image of a second scene; wherein the in-focus image of the first scene and the first alternative image are defined by a first transportable multi-image container, and wherein the in-focus image of second scene and second alternative image are defined by a second transportable multi-image container separate to the first transportable multi-image container.

20 Claims, 4 Drawing Sheets

(56) References Cited

U.S. PATENT DOCUMENTS

2019/0279684 A1* 9/2019 Kobayashi ......... G11B 27/3081
2019/0318538 A1* 10/2019 Li ........................... G06T 19/20

OTHER PUBLICATIONS

Systems, "High Efficiency Image File Format: Technical Overview and Examples," International Ogrnisation for Standardisation, Coding of Moving Pictures and Audio, ISO/IEC JTC1/SC29/WG11 MPEG2015/N15695, Geneva, Switzerland, Oct. 2015.
Sreedhar, K et al., "Information technology—High efficiency coding and media delivery in heterogeneous environments—Part 12: Image File Format—Amendment 2: Support for VVC, EVC, slideshows and other improvements," ISO/IEC JTC1/SC 29.

* cited by examiner

DISPLAYED IMAGE TRANSITION

TECHNOLOGICAL FIELD

Embodiments of the present disclosure relate to displayed image transition, that is transition between displayed images.

BACKGROUND

Apparatus now commonly have displays for displaying images such as, for example, still images or video images.

It is desirable to be able to change what is displayed, for example by transitioning from displaying an image of a first scene to displaying an image of a second scene.

However, sudden cuts from an image of one scene to an image of another scene can be distracting and even annoying to a user. This can result in a loss in formation communicated.

It would be desirable to improve a transition from displaying an image of a first scene to displaying an image of a second scene.

BRIEF SUMMARY

According to various, but not necessarily all, embodiments there is provided an apparatus comprising means configured to:
transition from displaying an in-focus image of a first scene to displaying a first alternative image;
transition from displaying the first alternative image to displaying a second alternative image;
transition from displaying the second alternative image to displaying an in-focus image of a second scene;
wherein the in-focus image of the first scene and the first alternative image are defined by a first transportable multi-image container, and
wherein the in-focus image of the second scene and the second alternative image are defined by a second transportable multi-image container separate to the first transportable multi-image container.

In some but not necessarily all examples, the in-focus image of the first scene is dependent upon a first image contained in the first transportable multi-image container and the first alternative image is dependent upon a second image contained in the first transportable multi-image container, wherein the second image contained in the first transportable multi-image container is a different image to the first image contained in the first transportable multi-image container, and
wherein the in-focus image of the second scene is dependent upon a fourth image contained in the second transportable multi-image container and the second alternative image is dependent upon a third image contained in the second transportable multi-image container, wherein the fourth image contained in the second transportable multi-image container is a different image to the third image contained in the second transportable multi-image container and to the first and second images contained in the first transportable multi-image container.

In some but not necessarily all examples, the first transportable multi-image container, containing the first image and defining the second image, enables non-destructive image editing of at least the first image and/or the second image.

In some but not necessarily all examples, wherein the first image and the second image defined by the first transportable multi-image container, are images in a burst of images captured contemporaneously at a first location at a first time and wherein the third image and the fourth image defined by the second transportable multi-image container, are images in a burst of images captured contemporaneously at a second location at a second time, wherein the first location and the second location are different and/or the first time and the second time are different.

In some but not necessarily all examples, the first transportable multi-image container enables rectangular cropping and at least 90° rotation of the first image and of the second image of the first transportable multi-image container, and
wherein the second transportable multi-image container enables rectangular cropping and at least 90° rotation of the third image and the fourth image of the second transportable multi-image container.

In some but not necessarily all examples, the first transportable multi-image container is a first High Efficiency Image File Format (HEIF) container and wherein the second transportable multi-image container is a second High Efficiency Image File Format (HEIF) container.

In some but not necessarily all examples, the first alternative image is an alternative image of the first scene compared to the in-focus image of the first scene and wherein the second alternative image is an alternative image of the second scene compared to the in-focus image of the second scene, wherein the first scene and the second scene are different in time and/or point of view.

In some but not necessarily all examples, the apparatus comprises means configured to select the first alternative image and/or the second alternative image so that a difference between a first cost and a second cost exceeds a threshold, wherein a cost function that defines a difference between images is used to determine the first cost for a difference between the in-focus image of the first scene and the in-focus image of the second scene and used to determine the second cost for a difference between the first alternative image and second alternative image.

In some but not necessarily all examples, the first alternative image has a higher measured blurriness in comparison to the in-focus image of the first scene and wherein the second alternative image has a higher measured blurriness in comparison to the in-focus image of the second scene.

In some but not necessarily all examples, the first alternative image is an image of the first scene that is less in-focus than the in-focus image of the first scene.

In some but not necessarily all examples, the in-focus image of the first scene is an image of the first scene captured from a first point of view and the first alternative image is an image of the first scene that is captured from a second point of view different to the first point of view.

In some but not necessarily all examples, the first alternative image is an image of the first scene at a relatively zoomed-in magnification and the in-focus image of the first scene is an image of the first scene at a relatively zoomed-out magnification.

In some but not necessarily all examples, the first alternative image is more correlated to the second alternative image than to the in-focus image of the second scene.

According to various, but not necessarily all, embodiments there is provided a method comprising:
transitioning from displaying an in-focus image of a first scene to displaying a first alternative image;
transitioning from displaying the first alternative image to displaying a second alternative image;

transitioning from displaying the second alternative image to displaying an in-focus image of a second scene;
wherein the in-focus image of the first scene and the first alternative image are defined by a first transportable multi-image container, and
wherein the in-focus image of second scene and second alternative image are defined by a second transportable multi-image container separate to the first transportable multi-image container.

According to various, but not necessarily all, embodiments there is provided a computer program that when run on one or more processors provides:
transitioning from displaying an in-focus image of a first scene to displaying a first alternative image;
transitioning from displaying the first alternative image to displaying a second alternative image;
transitioning from displaying the second alternative image to displaying an in-focus image of a second scene;
wherein the in-focus image of the first scene and the first alternative image are defined by a first transportable multi-image container, and
wherein the in-focus image of second scene and second alternative image are defined by a second transportable multi-image container separate to the first transportable multi-image container.

According to various, but not necessarily all, embodiments there is provided examples as claimed in the appended claims.

BRIEF DESCRIPTION

Some examples will now be described with reference to the accompanying drawings in which.

Figure 5A:
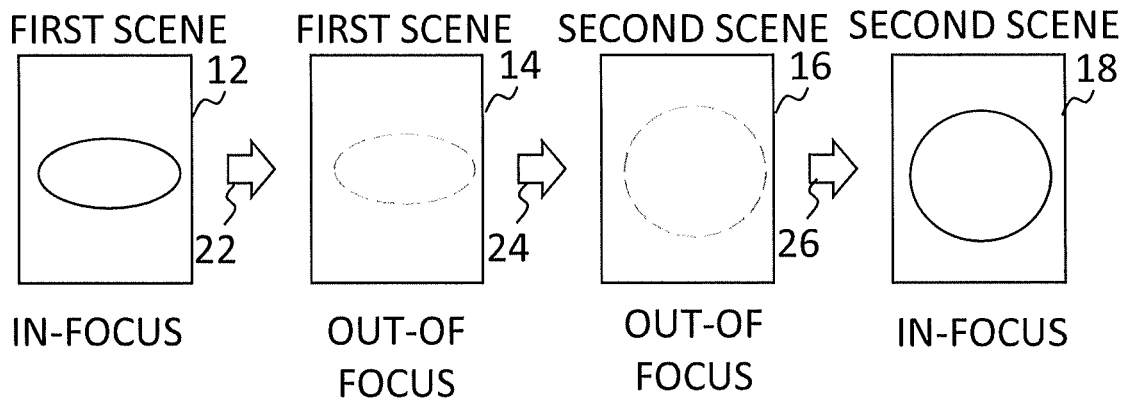
Figure 5B:
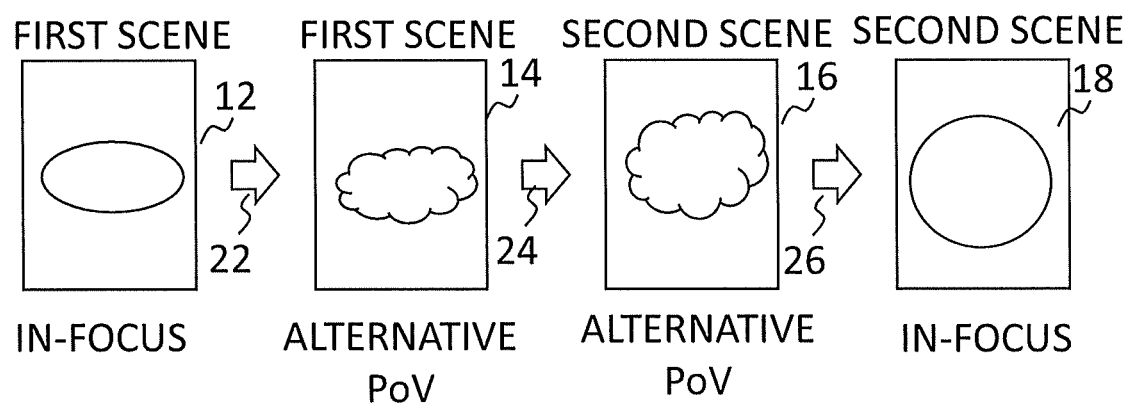
Figure 5C:
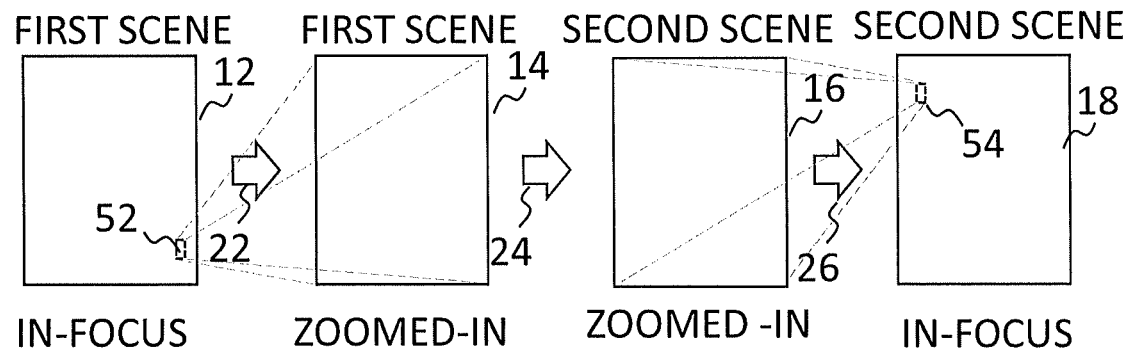
Figure 6:
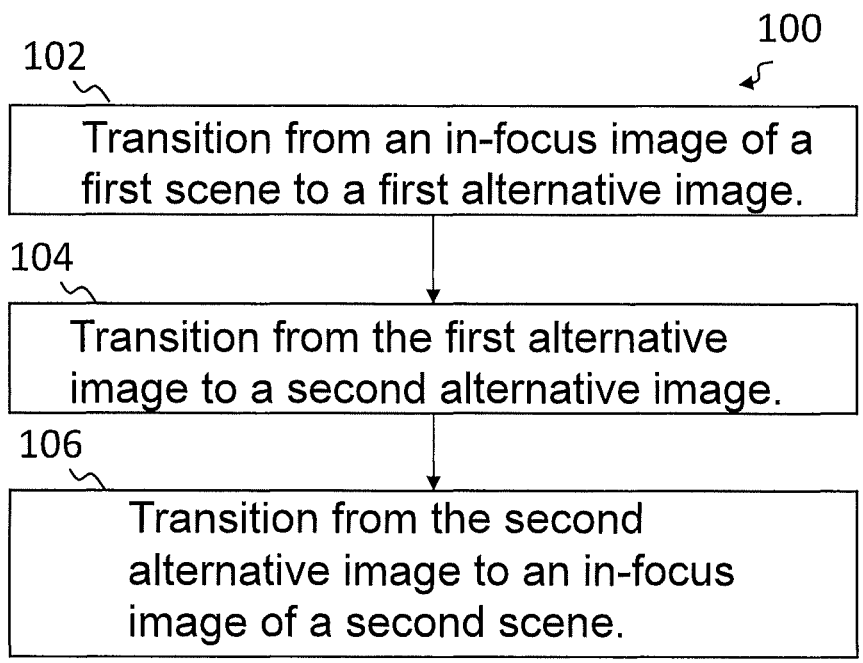
Figure 7:
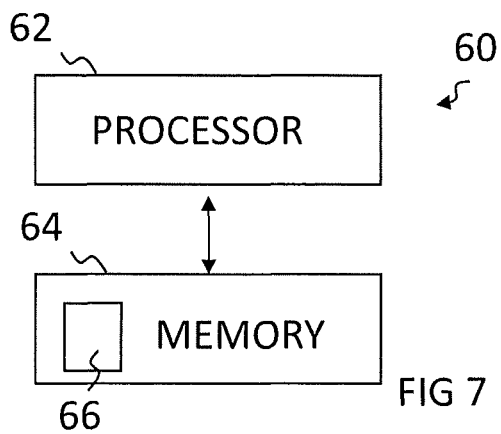
Figure 9:
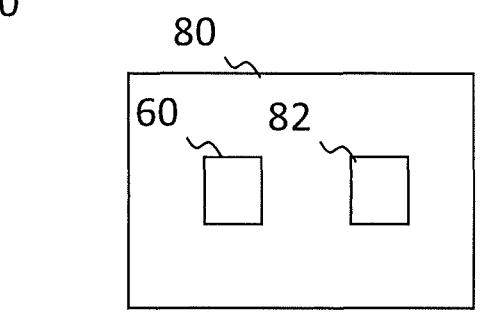
Figure 8:
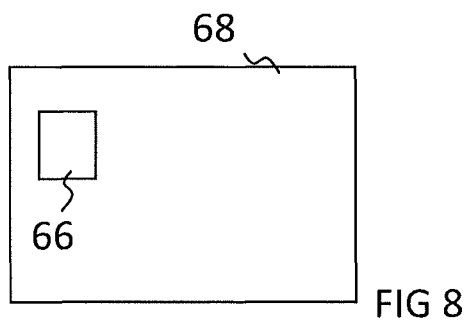

FIGS. 5A, 5B, 5C illustrate different examples of transitioning from displaying an in-focus image of a first scene to displaying an in-focus image of a second scene via transitions from displaying the in-focus image of the first scene to displaying a first alternative image, from displaying the first alternative image to displaying a second alternative image, and from displaying the second alternative image to displaying the in-focus image of a second scene;

FIG. 6 illustrates an example of a method of transitioning from displaying an in-focus image of a first scene to displaying an in-focus image of a second scene via transitions from displaying the in-focus image of the first scene to displaying a first alternative image, from displaying the first alternative image to displaying a second alternative image, and from displaying the second alternative image to displaying the in-focus image of the second scene;

FIG. 7 illustrates an example of a controller;
FIG. 8 illustrates an example of a computer program;
FIG. 9 illustrates an example of an apparatus.

DETAILED DESCRIPTION

Figure 1:
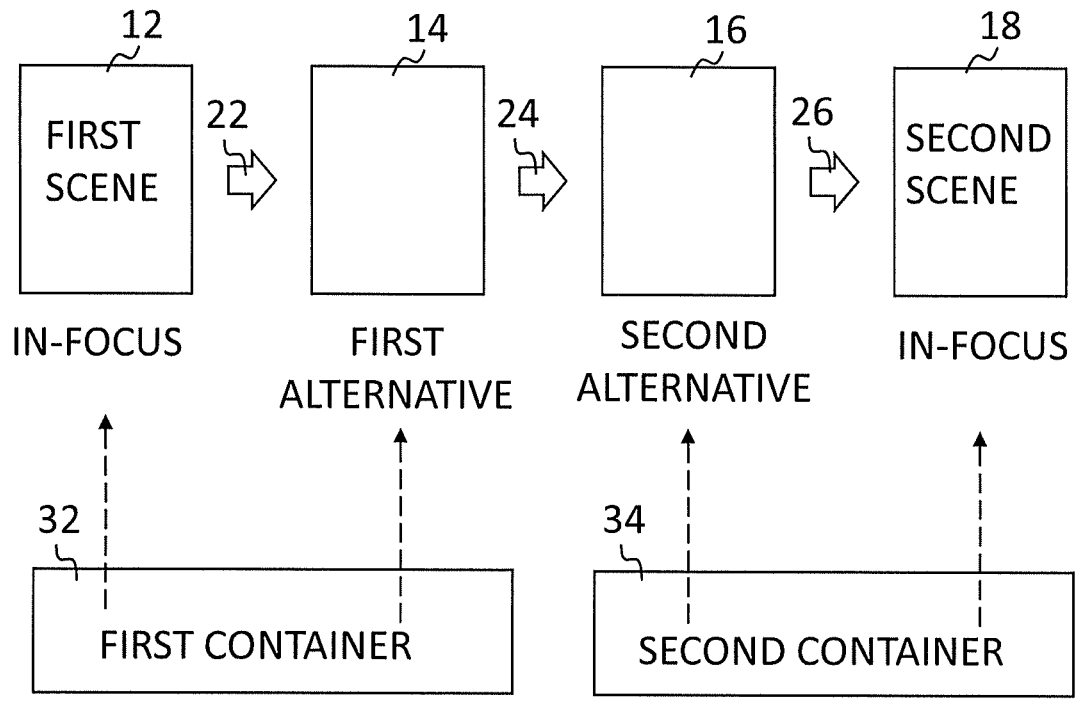
FIG. 1 illustrates an example of transitioning from displaying an in-focus image of a first scene to displaying a first alternative image, transitioning from displaying the first alternative image to displaying a second alternative image, and transitioning from displaying the second alternative image to displaying an in-focus image of a second scene.

FIG. 1 illustrates an example of operation an apparatus. The apparatus is configured to: transition 22 from displaying an in-focus image 12 of a first scene to displaying a first alternative image 14;
transition 24 from displaying the first alternative image 14 to displaying a second alternative image 16; and
transition 26 from displaying the second alternative image 16 to displaying an in-focus image 18 of a second scene.

The in-focus image 12 of the first scene and the first alternative image 14 are defined by a first transportable multi-image container 32.

The in-focus image 18 of second scene and second alternative image 16 are defined by a second transportable multi-image container 34 separate to the first transportable multi-image container 32.

A transportable multi-image container 34, 32 is a transportable data structure that is configured to define multiple images.

Figure 2:
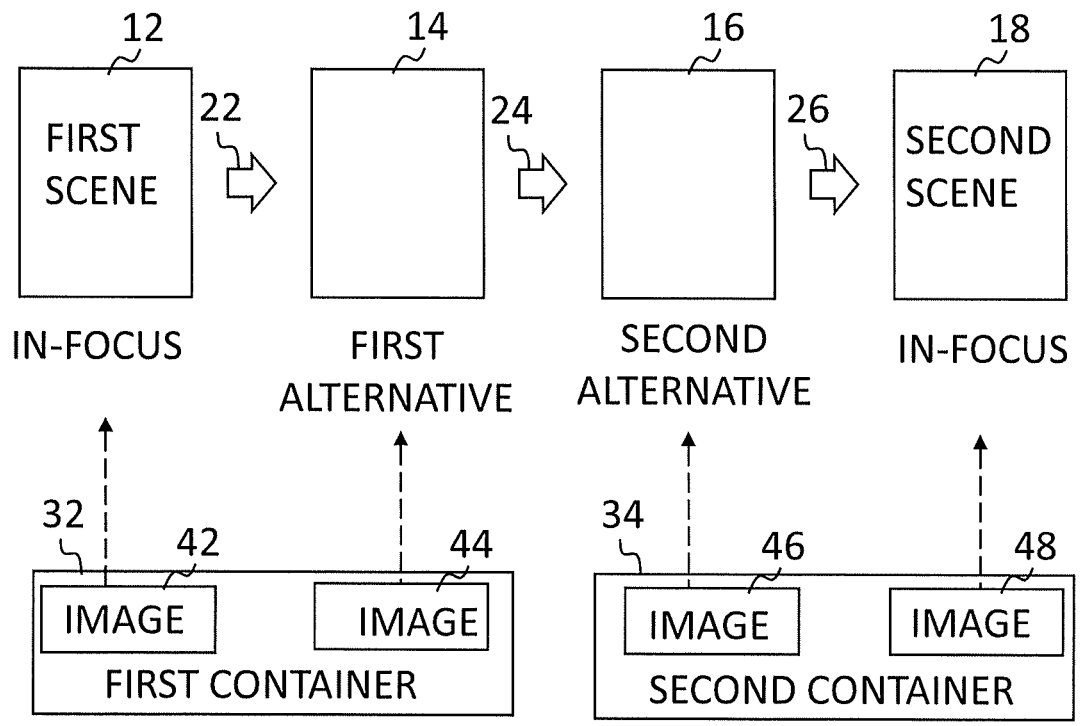
FIG. 2 illustrates another example of transitioning from displaying an in-focus image of a first scene to displaying a first alternative image, transitioning from displaying the first alternative image to displaying a second alternative image, and transitioning from displaying the second alternative image to displaying an in-focus image of a second scene.

FIG. 2 is similar to FIG. 1. However, in this example, the images 12, 14 are dependent upon images 42, 44 contained in the first transportable multi-image container 32. The in-focus image 12 of the first scene is dependent upon a first image 42 contained in the first transportable multi-image container 32. The first alternative image 14 is dependent upon a second image 44 contained in the first transportable multi-image container 32. The second image 44 contained in the first transportable multi-image container 32 is a different image to the first image 42 contained in the first transportable multi-image container 32.

Also, in this example but not necessarily all examples, the images 16, 18 are dependent upon images 46, 48 contained in the second transportable multi-image container 34. The in-focus image 18 of the second scene is dependent upon a fourth image 48 contained in the second transportable multi-image container 34 and the second alternative image 16 is dependent upon a third image 46 contained in the second transportable multi-image container 34. The fourth image 48 contained in the second transportable multi-image container 34 is a different image to the third image 46 contained in the second transportable multi-image container 34 and to the first and second images 42, 44 contained in the first transportable multi-image container 32.

Images can be contained in a transportable multi-image container 32, 34 in a compressed or non-compressed format. In some examples, a reference image is used for the compression of a target image by the definition of changes required to convert between the reference image and the target image.

In some examples, the reference image for the first transportable multi-image container 32 is the image 42 and the image 44 is the target image, or vice versa.

In some examples, the reference image for the second transportable multi-image container 34 is the image 48 and the image 46 is the target image, or vice versa.

An image 12, 14, 16, 18 can be dependent upon an image 42, 44, 46, 48 because some or all of its information content is determined by the respective image 42, 44, 46, 48. For example, the image 12, 14, 16, 18 can be a non-compressed or processed version of the image 42, 44, 46, 48. For example, the image 12, 14, 16, 18 can be a cropped portion of the image 42, 44, 46, 48.

Thus, in some examples, the first transportable multi-image container 32 contains multiple images 42, 44 and at least some of the multiple images 42, 44 are in a compressed form. In these or other examples, the second transportable multi-image container 34 defines multiple images 46, 48 and at least some of the multiple images 46, 48 are in a compressed form.

In some but not necessarily all examples, the first transportable multi-image container 32, containing the first image 42 and the second image 44, enables non-destructive image editing of at least the first image 42 and/or the second image 44. The image 42, 44 can be edited and the edited image can be saved within the first transportable multi-image container 32 as an additional image. The original image is retained in the first transportable multi-image container 32.

In some but not necessarily all examples, the second transportable multi-image container 34, containing the third image 46 and the fourth image 48, enables non-destructive image editing of at least the third image 46 and/or the fourth image 48. The image 46, 48 can be edited and the edited image can be saved within the second transportable multi-image container 34 as an additional image. The original image is retained in the second transportable multi-image container 34.

In some but not necessarily all examples, a first transportable multi-image container 32 defines multiple images that have been captured as a burst.

In some but not necessarily all examples, the first image 42 and the second image 44 defined by the first transportable multi-image container 32, are images in a burst of images captured contemporaneously at a first location.

In some but not necessarily all examples. the third image 46 and the fourth image 48 defined by the second transportable multi-image container 34, are images in a burst of images captured contemporaneously at a second location, different from the first location.

In some but not necessarily all examples, the first image and the second image defined by the first transportable multi-image container, are images in a burst of images captured contemporaneously at a first location at a first time and the third image and the fourth image defined by the second transportable multi-image container, are images in a burst of images captured contemporaneously at a second location at a second time, wherein the first location and the second location are different and/or the first time and the second time are different.

A burst of images is typically a time-sequence of images taken at a particular point of view (a particular location with a particular orientation). However, in some examples, a burst of images is a time-spatial sequence of images taken at a particular location with a time-varying orientation. In some examples, a burst of images is a spatial-sequence of images taken at a particular location, simultaneously with different orientations.

In some but not necessarily all examples, a transportable multi-image container 32, 34 enables rectangular cropping and at least 90° rotation of one or more of the images it contains. In some but not necessarily all examples, the first transportable multi-image container 32 enables rectangular cropping and at least 90° rotation of the first image 42 and of the second image 44 of the first transportable multi-image container 32. In some but not necessarily all examples, the second transportable multi-image container 34 enables rectangular cropping and at least 90° rotation of the third image 46 and the fourth image 48 of the second transportable multi-image container 34.

In some but not necessarily all examples, one or both of the transportable multi-image containers 32, 34 are High Efficiency Image File (HEIF) containers. The first transportable multi-image container 32 can be a first High Efficiency Image File Format (HEIF) container and the second transportable multi-image container 34 can be a second High Efficiency Image File Format (HEIF) container.

The High Efficiency Image File Format (HEIF, ISO/IEC 23008-12) specifies the storage of individual images, image sequences and their metadata into a container file conforming to the ISO Base Media File Format (ISO/IEC 14496-12). HEIF includes the storage specification of High Efficiency Video Coding (HEVC) intra images and HEVC image sequences in which inter prediction is applied in a constrained manner.

Referring back to the examples illustrated in FIGS. 1 and 2, in some but not necessarily all examples, the first alternative image 14 is an alternative image of the first scene. It is an alternative compared to the in-focus image 12 of the first scene. In some but not necessarily all examples, the second alternative image 16 is an alternative image of the second scene. It is an alternative compared to the in-focus image 18 of the second scene.

The first scene and the second scene are different in time and/or point of view (location and/or orientation). Scenes are different when they have no overlapping content, and are separated and distinct in time and/or space.

In some but not necessarily all examples, a transportable multi-image container 32, 34 can be associated with a particular scene. In this case, all the images defined by the container are images of the associated scene. In this example, different transportable multi-image containers 32, 34 can be associated with different scenes.

In some examples, a series of images can be used as the first alternative image 14. One or more images of the series of images can be defined by the first transportable multi-image container 32. In some examples, a series of images can be used as the second alternative image 16. One or more images of the series of images can be defined by the second transportable multi-image container 34.

In some examples, there is a direct transition between the augmenting first alternative image 14 and the second alternative image 16. There are no images between the first alternative image 14 and the second alternative image 16.

In some examples, there is an indirect transition between the augmenting first alternative image 14 and the second alternative image 16. There is one or more bridging images between the first alternative image 14 and the second alternative image 16. The one or more bridging images can be dependent upon the first alternative image 14 and the second alternative image 16. The one or more bridging images can comprise a combined image based on the first alternative image 14 and the second alternative image 16. For example, a bridging image can be a crossfaded image that crossfades the first alternative image 14 and the second alternative image 16. In cross-fading, the first alternative image 14 and the second alternative image 16 are layered over each other with reduced opacity to create the bridging image. For example, a sequence of bridging images can be created by sequential cross-fading the first alternative image 14 and the second alternative image 16. In sequential cross-fading, the first alternative image 14 and the second alternative image 16 are layered over each other in a sequence of combined images created by reducing the opacity of the cross first alternative image 14 while simultaneously increasing the opacity of the second alternative image 16.

Referring back to FIGS. 1 and 2, an objective is to select appropriate images 12, 14, 16, 18.

If the starting image 12 and the ending image 18 are given, then the objective is: given starting image 12 defined by a first transportable multi-image container 32 and ending image 18 defined by a second transportable multi-image container 34 what image defined by the first transportable multi-image container 32 should be used as the first alternative image 14 and what image defined by the second transportable multi-image container 34 should be used as the second alternative image 16.

A cost function that accounts for differences/similarities between images can be used to select the first alternative image 14 from the first transportable multi-image container 32 and the second alternative image 16 from the second transportable multi-image container 34 to meet the objective.

Figure 3:
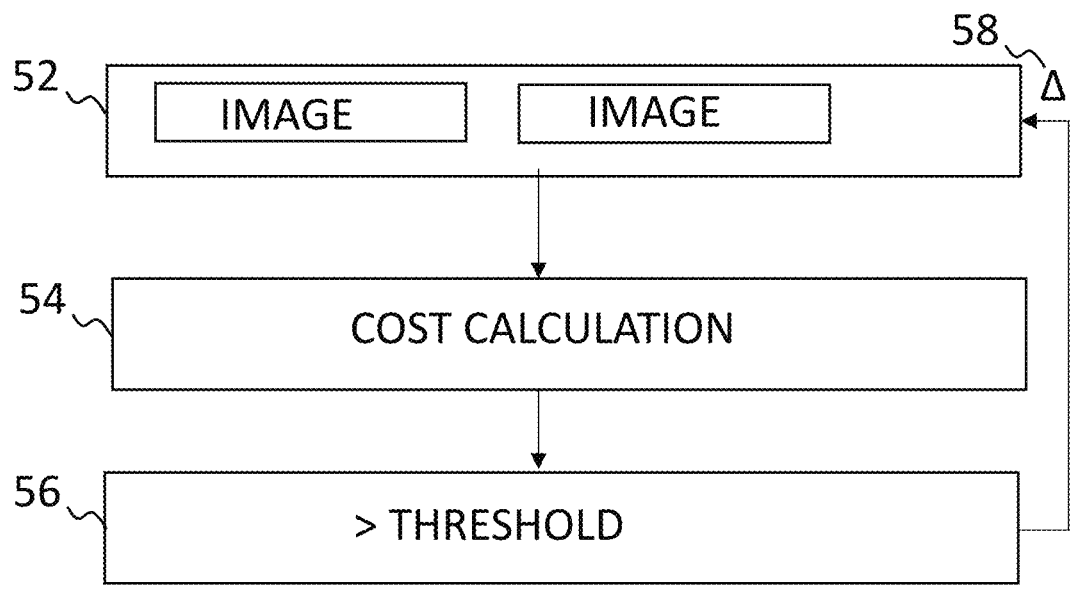
FIG. 3 illustrates an example of a cost function used for the determination of usable images.

FIG. 3 illustrates a suitable cost function that can receive 52 two images and compare the two images by performing 54 a cost calculation, and then assessing 56 the cost to decide whether to select the images or to change 58 the images used. Pairs of suitable images e.g., 12, 14 or 14, 16 or 16, 18 can therefore be searched to find usable images 12, 14, 16, 18 for the transitions 22, 24, 26.

Figure 4:
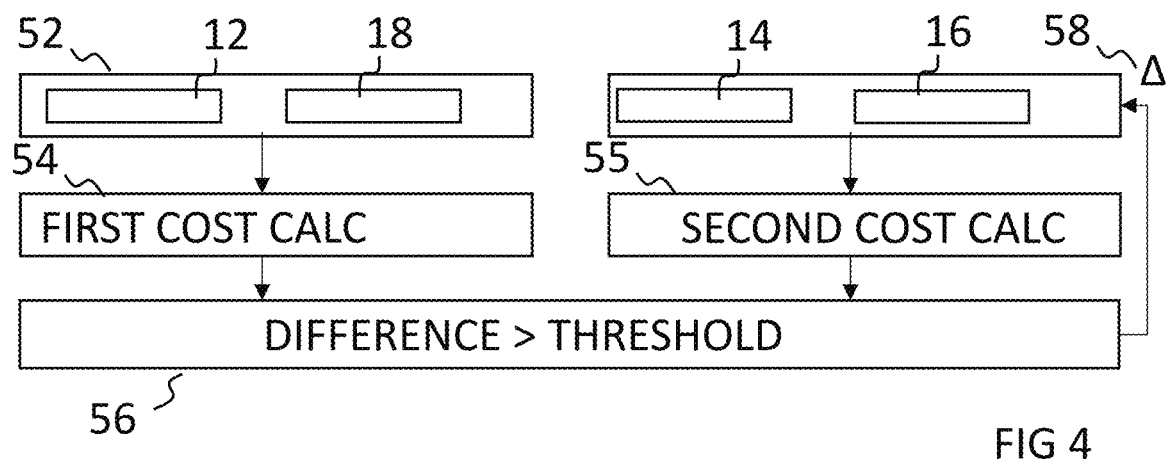
FIG. 4 illustrates an example of a cost function used for the determination of usable alternative images for use in transitioning from the in-focus image of the first scene to the in-focus image of the second scene.

In the example of FIG. 4, the cost function is used to determine 54 a first cost for a difference between the in-focus image 12 of the first scene and the in-focus image 18 of the second scene.

The cost function is also used to determine 55 a second cost for a difference between the first alternative image 14 and second alternative image 16.

The first alternative image 14 and/or the second alternative image 16 are selected 58 so that a difference between the first cost and the second cost exceeds 56 a threshold.

For example, the first alternative image 14 and/or the second alternative image 16 is/are selected so that a similarity between the first alternative image 14 and the second alternative image 16 exceeds a similarity between the starting image 12 and the ending image 18 by at least the threshold.

For example, the first alternative image 14 and/or the second alternative image 16 is/are selected so that a dissimilarity between the starting image 12 and the ending image 18 exceeds a dissimilarity between the first alternative image 14 and the second alternative image 16 by at least the threshold.

The cost function can define a difference between features of images. In some but not necessarily all examples, the features comprise or are an edge (e.g., vertical edges and/or horizontal edges), or a pixel or kernel of pixels or some other feature such as interest points.

The threshold can be fixed or controllable. In some but not necessarily all examples, the threshold can be set by a user.

The cost function can define similarity or dissimilarity. The cost function can be defined explicitly as a determinative function. Alternatively, the cost function can be defined implicitly e.g., as a neural network or other trained machine learning algorithm The cost function can define blur. Blur can be defined in the spatial frequency domain as having lower variance at higher frequencies (lack of distinctive structure at shorter distances)

Spatial domain techniques can be used to enable the cost function to evaluate changes of high contrast sharp features of the image such as edges, corners, and textures that undergo significant changes during image degradation.

Frequency domain techniques can be used to enable the cost function to evaluate changes in the statistical features of the power spectrum of the image.

In one example of a cost function, $I_1(i)$ represents the features of in-focus image 12, $I_2(i)$ represents the corresponding features of in-focus image 18, $I_{1'}(i)$ represents the corresponding features of first alternative image 14, $I_{2'}(i)$ represents the corresponding features of second alternative image 16, then the first cost can be represented as Sum $\{I_1(i)-I_2(i)\}^2\}$ and the second cost can be represented as Sum $\{I_{1'}(i)=I_{2'}(i)\}^2\}$.

FIG. 5A illustrates an example of inter-scene blur (between scene blur). The first alternative image 14 has a higher measured blurriness in comparison to the in-focus image 12 of the first scene. The second alternative image 16 has a higher measured blurriness in comparison to the in-focus image 18 of second scene.

In this example, but not necessarily all examples, the first alternative image 14 is an image of the first scene that is less in-focus than the in-focus image 12 of the first scene. For example, the first alternative image 14 can be one where an unfocused object moves to cover much of the video.

In this example, but not necessarily all examples, the second alternative image 16 is an image of the second scene that is less in-focus than the in-focus image 18 of the second scene. For example, the second alternative image 16 can be one where an unfocused object moves to cover much of the video.

The images 12, 14 can be images at the same scale.

FIG. 5B illustrates an example of inter-scene similarity. The first alternative image 14 is an image of the first scene that is similar to the second alternative image 16 of the second scene.

In this example the measured similarity between the first alternative image 14 and the second alternative image 16 exceeds (by a threshold) a measured similarity between the first alternative image 14 and the in-focus image 12 of the threshold first scene, exceeds (by a same or different threshold) a measured similarity between the second alternative image 16 and the in-focus image 18 of the threshold second scene threshold, and exceeds (by a same or different threshold) a measured similarity between the in-focus image 12 and the in-focus image 18.

In this example, the first alternative image 14 is conceptually similar to the second alternative image 16 because they are both images of similar objects, in this case clouds.

In this example, but not necessarily all examples, the in-focus image 12 of the first scene is an image of the first scene captured from a first point of view and the first alternative image 14 is an image of the first scene that is captured from a second point of view different to the first point of view. Thus, panning or tracking can be used to move between the in-focus image 12 and the alternative image 14.

Optionally, the second alternative image 16 is an image of the second scene that is captured from a third point of view and the in-focus image 18 of the second scene is an image of the second scene captured from a fourth point of view different to the third point of view. Thus, panning or tracking can be used to move between the alternative image 14 and the in-focus image 18.

In this example, the first alternative image 14 and the second alternative image 16 are illustrated as in-focus, however in other examples they can additionally be blurry as described with reference to FIG. 5A. In this case, the point of view is selected so that an unfocused object becomes center of image for the alternative images 14, 16.

A point of view can be defined by an orientation or by orientation and location. An orientation can be defined in two degrees or three degrees. A location can be defined in two degrees or three degrees. It is possible to have image content that relates to points of view defined by three degrees of freedom (DoF) for orientation, from the same location. This can be referred to as 3 DoF content. It is possible to have image content that relates to points of view defined by three degrees of freedom (DoF) for orientation, from slightly varying location e.g. representing a lean or tilt. This can be referred to as 3 DoF+ content. It is possible to have image content that relates to points of view defined by three degrees of freedom (DoF) for orientation, and independently defined by three degrees of freedom for location. This can be referred to as 6 DoF content.

The 3 DoF, 3 DoF+ or 6 DoF content associated with the first transportable multi-image container 32 can be used to determine the images 12, 14. The 3 DoF, 3 DoF+ or 6 DoF content associated with the second transportable multi-image container 34 can be used to determine the images 16, 18.

FIG. 5C illustrates an example of inter-scene transitional similarity. The transition from the image 12 to the first alternative image 14 is a conceptually similar transition to a nominal transition from the image 18 to the second alternative image 14. Thus, the transition from the image 12 to the first alternative image 14 is reversed by the transition from the second alternative image 14 to the image 18.

In the example illustrated, transition 22 from the image 12 to the first alternative image 14 is a zoom-in on a sub-portion of the image 12 to create the first alternative image 14 and the transition 26 form the alternative second image 16 to the image 18 is a zoom-out from the second alternative image 16 so that it becomes a sub-portion of the image 18. The similarity in transition can be to different extents. For example, both transitions 22, 26 relate to re-scaling (e.g. zoom-in, zoom-out). In some examples, both transitions 22, 26 relate to re-scaling by the same amount and in this example the sub-portion of the image 12 and the sub-portion of the image 18 may be of substantially the same size.

In FIG. 5C, the first alternative image 14 is an image of the first scene at a relatively zoomed-in magnification and the in-focus image 12 of the first scene is an image of the first scene at a relatively zoomed-out magnification. For example, the image 14 can be created by cropping to an unfocused sub-portion of the image 12.

The second alternative image 16 is an image of the second scene at a relatively zoomed-in magnification and the in-focus image 18 of the second scene is an image of the second scene at a relatively zoomed-out magnification. For example, the image 16 can be created by cropping to an unfocused sub-portion of the image 18.

It will be appreciated from the foregoing that in at least some examples the first alternative image 14 is more correlated to the second alternative image 16 than to the in-focus image 12 of the first scene and/or the in-focus image 18 of the second scene. Additionally, or alternatively, the second alternative image 16 is more correlated to the first alternative image 14 than to the in-focus image 18 of the second scene and/or the in-focus image 12 of the first scene.

Such higher correlation between images can arise because the images:
share a common object, share a common pose of an object, share a sharpness/blurriness, share similarity.

In the examples of FIG. 5A, 5B, 5C the transition between the first alternative image 14 and the second alternative image 16 can be a direct transition or an indirect transition that uses one or more bridging images, for example cross-faded images, as previously described.

FIG. 6 illustrates an example of a method 100. The method 100 enables an overall transition from displaying an in-focus image 12 of a first scene to displaying a an in-focus image 18 of a second scene, using intermediate transitions.

At block 102, the method 100 comprises transitioning from displaying an in-focus image 12 of a first scene to displaying a first alternative image 14.

At block 104, the method 100 comprises transitioning from displaying the first alternative image 14 to displaying a second alternative image 16.

At block 106, the method 100 comprises transitioning from displaying the second alternative image 16 to displaying an in-focus image 18 of a second scene.

The in-focus image 12 of the first scene and the first alternative image 14 are defined by a first transportable multi-image container 32.

The in-focus image 18 of second scene and second alternative image 16 are defined by a second transportable multi-image container 34 separate to the first transportable multi-image container 32.

FIG. 7 illustrates an example of a controller 60. Implementation of a controller 60 may be as controller circuitry. The controller 60 may be implemented in hardware alone, have certain aspects in software including firmware alone or can be a combination of hardware and software (including firmware).

As illustrated in FIG. 7 the controller 60 may be implemented using instructions that enable hardware functionality, for example, by using executable instructions of a computer program 66 in a general-purpose or special-purpose processor 62 that may be stored on a computer readable storage medium (disk, memory etc.) to be executed by such a processor 62.

The processor 62 is configured to read from and write to the memory 64. The processor 62 may also comprise an output interface via which data and/or commands are output by the processor 62 and an input interface via which data and/or commands are input to the processor 62.

The memory 64 stores a computer program 66 comprising computer program instructions (computer program code) that controls the operation of the apparatus 80 when loaded into the processor 62. The computer program instructions, of the computer program 66, provide the logic and routines that enables the apparatus to perform the methods illustrated in any of FIGS. 1 to 6. The processor 62 by reading the memory 64 is able to load and execute the computer program 66.

The apparatus 80 therefore comprises:
at least one processor 62; and
at least one memory 64 including computer program code
the at least one memory 64 and the computer program code configured to, with the at least one processor 62, cause the apparatus 80 at least to perform:
transitioning from displaying an in-focus image of a first scene to displaying a first alternative image;
transitioning from displaying the first alternative image 14 to displaying a second alternative image 16;
transitioning from displaying the second alternative image 16 to displaying an in-focus image 18 of a second scene;
The in-focus image 12 of the first scene and the first alternative image 14 are defined by a first transportable multi-image container 32. The in-focus image 18 of second scene and second alternative image 16 are defined by a second transportable multi-image container 34 separate to the first transportable multi-image container 32.

As illustrated in FIG. 8, the computer program 66 may arrive at the apparatus 80 via any suitable delivery mechanism 68. The delivery mechanism 68 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 66. The delivery mechanism may be a signal configured to reliably transfer the computer program 66. The apparatus 80 may propagate or transmit the computer program 66 as a computer data signal.

Computer program instructions for causing an apparatus to perform at least the following or for performing at least the following:
  transitioning from displaying an in-focus image of a first scene to displaying a first alternative image;
  transitioning from displaying the first alternative image to displaying a second alternative image;
  transitioning from displaying the second alternative image to displaying an in-focus image of a second scene.

The in-focus image of the first scene and the first alternative image are defined by a first transportable multi-image container, and the in-focus image of second scene and second alternative image are defined by a second transportable multi-image container separate to the first transportable multi-image container.

The computer program instructions may be comprised in a computer program, a non-transitory computer readable medium, a computer program product, a machine readable medium. In some but not necessarily all examples, the computer program instructions may be distributed over more than one computer program.

Although the memory 64 is illustrated as a single component/circuitry it may be implemented as one or more separate components/circuitry some or all of which may be integrated/removable and/or may provide permanent/semi-permanent/dynamic/cached storage.

Although the processor 62 is illustrated as a single component/circuitry it may be implemented as one or more separate components/circuitry some or all of which may be integrated/removable. The processor 62 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

FIG. 9 illustrates an example of an apparatus 80 comprising a display 82. In this example, but not necessarily all examples the display 82 id controlled by a controller 60.

The apparatus is configured to:
  transition 22 from displaying an in-focus image 12 of a first scene to displaying a first alternative image 14;
  transition 24 from displaying the first alternative image 14 to displaying a second alternative image 16; and
  transition 26 from displaying the second alternative image 16 to displaying an in-focus image 18 of a second scene.

The in-focus image 12 of the first scene and the first alternative image 14 are defined by a first transportable multi-image container 32.

The in-focus image 18 of second scene and second alternative image 16 are defined by a second transportable multi-image container 34 separate to the first transportable multi-image container 32.

The displaying occurs via display 82. Displaying in this sense means enabling a user to see the image. The display can be a display screen such as a light-emitting-diode (LED), organic light emitting diode (OLED), liquid crystal display (LCD) or similar. The display can be a projective display. One example of a projective display is a near eye display that projects light into a user's eye.

The blocks illustrated in the FIG. 6 may represent steps in a method and/or sections of code in the computer program 66. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

As used here 'module' refers to a unit or apparatus that excludes certain parts/components that would be added by an end manufacturer or a user. The controller can be a module, for example.

The above-described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
at least one processor; and
at least one memory storing instructions that, when executed with the at least one processor, cause the apparatus to:
transition from displaying an in-focus image of a first scene to displaying a first alternative image;
transition from displaying the first alternative image to displaying a second alternative image;
transition from displaying the second alternative image to displaying an in-focus image of a second scene;
wherein the in-focus image of the first scene and the first alternative image are defined with a first transportable multi-image container, and
wherein the in-focus image of the second scene and the second alternative image are defined with a second transportable multi-image container separate to the first transportable multi-image container; and
select the first alternative image and/or the second alternative image so that a difference between a first cost and a second cost exceeds a threshold, wherein a cost function that defines a difference between images is used to determine:
the first cost for a difference between the in-focus image of the first scene and the in-focus image of the second scene; and
the second cost for a difference between the first alternative image and the second alternative image.

2. An apparatus as claimed in claim 1, wherein the in-focus image of the first scene is dependent upon a first image contained in the first transportable multi-image container and the first alternative image is dependent upon a second image contained in the first transportable multi-image container, wherein the second image contained in the first transportable multi-image container is a different image to the first image contained in the first transportable multi-image container, and
wherein the in-focus image of the second scene is dependent upon a fourth image contained in the second transportable multi-image container and the second alternative image is dependent upon a third image contained in the second transportable multi-image container, wherein the fourth image contained in the second transportable multi-image container is a different image to the third image contained in the second transportable multi-image container and to the first and second images contained in the first transportable multi-image container.

3. An apparatus as claimed in claim 2, wherein the first transportable multi-image container, containing the first image and the second image, enables non-destructive image editing of at least the first image and/or the second image.

4. An apparatus as claimed in claim 2, wherein the first image and the second image contained in the first transportable multi-image container, are images in a burst of images captured contemporaneously at a first location at a first time and wherein the third image and the fourth image contained in the second transportable multi-image container, are images in a burst of images captured contemporaneously at a second location at a second time, wherein the first location and the second location are different and/or the first time and the second time are different.

5. An apparatus as claimed in claim 2, wherein the first transportable multi-image container enables rectangular cropping and at least 90° rotation of the first image and of the second image of the first transportable multi-image container, and wherein the second transportable multi-image container enables rectangular cropping and at least 90° rotation of the third image and the fourth image of the second transportable multi-image container.

6. An apparatus as claimed in claim 1 wherein the first transportable multi-image container is a first high efficiency image file format container and wherein the second transportable multi-image container is a second high efficiency image file format container.

7. An apparatus as claimed in claim 1, wherein the first alternative image is an alternative image of the first scene compared to the in-focus image of the first scene and wherein the second alternative image is an alternative image of the second scene compared to the in-focus image of the second scene, wherein the first scene and the second scene are different in time and/or point of view.

8. An apparatus as claimed in claim 1 wherein the first alternative image has a higher measured blurriness in comparison to the in-focus image of the first scene, and wherein the second alternative image has a higher measured blurriness in comparison to the in-focus image of the second scene.

9. An apparatus as claimed in claim 1, wherein the first alternative image is an image of the first scene that is less in-focus than the in-focus image of the first scene.

10. An apparatus as claimed in claim 1, wherein the in-focus image of the first scene is an image of the first scene captured from a first point of view, and the first alternative image is an image of the first scene that is captured from a second point of view different to the first point of view.

11. An apparatus as claimed in claim 1, wherein the first alternative image is an image of the first scene at a relatively zoomed-in magnification, and the in-focus image of the first scene is an image of the first scene at a relatively zoomed-out magnification.

12. An apparatus as claimed in claim 1, wherein the first alternative image is more correlated to the second alternative image than to the in-focus image of the second scene.

13. A method comprising:
transitioning from displaying an in-focus image of a first scene to displaying a first alternative image;
transitioning from displaying the first alternative image to displaying a second alternative image;
transitioning from displaying the second alternative image to displaying an in-focus image of a second scene;
wherein the in-focus image of the first scene and the first alternative image are defined with a first transportable multi-image container, and
wherein the in-focus image of second scene and second alternative image are defined with a second transportable multi-image container separate to the first transportable multi-image container; and
selecting the first alternative image and/or the second alternative image so that a difference between a first cost and a second cost exceeds a threshold, wherein a cost function that defines a difference between images is used to determine:
the first cost for a difference between the in-focus image of the first scene and the in-focus image of the second scene; and
the second cost for a difference between the first alternative image and the second alternative image.

14. A method as claimed in claim 13, wherein the in-focus image of the first scene is dependent upon a first image contained in the first transportable multi-image container and the first alternative image is dependent upon a second image contained in the first transportable multi-image container, wherein the second image contained in the first transportable multi-image container is a different image to the first image contained in the first transportable multi-image container, and
wherein the in-focus image of the second scene is dependent upon a fourth image contained in the second transportable multi-image container and the second alternative image is dependent upon a third image contained in the second transportable multi-image container, wherein the fourth image contained in the second transportable multi-image container is a different image to the third image contained in the second transportable multi-image container and to the first and second images contained in the first transportable multi-image container.

15. A method as claimed in claim 14, wherein the first transportable multi-image container, containing the first image and the second image, enables non-destructive image editing of at least the first image and/or the second image.

16. A method as claimed in claim 14, wherein the first image and the second image contained in the first transportable multi-image container, are images in a burst of images captured contemporaneously at a first location at a first time and wherein the third image and the fourth image contained in the second transportable multi-image container, are images in a burst of images captured contemporaneously at a second location at a second time, wherein the first location and the second location are different and/or the first time and the second time are different.

17. A method as claimed in claim 14, wherein the first transportable multi-image container enables rectangular cropping and at least 90° rotation of the first image and of the second image of the first transportable multi-image container, and wherein the second transportable multi-image container enables rectangular cropping and at least 90° rotation of the third image and the fourth image of the second transportable multi-image container.

18. A method as claimed in claim 13, wherein the first transportable multi-image container is a first high efficiency image file format container and wherein the second transportable multi-image container is a second high efficiency image file format container.

19. A method as claimed in claim 13, wherein the first alternative image is an alternative image of the first scene compared to the in-focus image of the first scene and wherein the second alternative image is an alternative image of the second scene compared to the in-focus image of the second scene, wherein the first scene and the second scene are different in time and/or point of view.

20. A non-transitory computer readable medium comprising instructions stored thereon for performing at least the following:
- transitioning from displaying an in-focus image of a first scene to displaying a first alternative image;
- transitioning from displaying the first alternative image to displaying a second alternative image;
- transitioning from displaying the second alternative image to displaying an in-focus image of a second scene;
- wherein the in-focus image of the first scene and the first alternative image are defined with a first transportable multi-image container, and
- wherein the in-focus image of second scene and second alternative image are defined with a second transportable multi-image container separate to the first transportable multi-image container; and
- selecting the first alternative image and/or the second alternative image so that a difference between a first cost and a second cost exceeds a threshold, wherein a cost function that defines a difference between images is used to determine:
  - the first cost for a difference between the in-focus image of the first scene and the in-focus image of the second scene; and
  - the second cost for a difference between the first alternative image and the second alternative image.

* * * * *